United States Patent
Hodge

(10) Patent No.: US 11,829,955 B2
(45) Date of Patent: Nov. 28, 2023

(54) SYSTEM AND METHOD FOR PROVIDING JOB-SPECIFIC TRAINING AND EMPLOYMENT TO RESIDENTS OF A CONTROLLED ENVIRONMENT FACILITY

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 17/451,672

(22) Filed: Oct. 21, 2021

(65) Prior Publication Data

US 2022/0108279 A1 Apr. 7, 2022

Related U.S. Application Data

(63) Continuation of application No. 15/655,746, filed on Jul. 20, 2017, now Pat. No. 11,164,151.

(51) Int. Cl.
*H04L 12/18* (2006.01)
*G06Q 10/0631* (2023.01)
(Continued)

(52) U.S. Cl.
CPC . *G06Q 10/1053* (2013.01); *G06Q 10/063112* (2013.01); *H04L 12/1822* (2013.01);
(Continued)

(58) Field of Classification Search
CPC ........ G06Q 10/1053; G06Q 10/063112; H04L 12/1822; H04L 12/1831; H04L 51/214;
(Continued)

(56) References Cited

U.S. PATENT DOCUMENTS 6,734,900 B2 5/2004 Mayhew
6,810,527 B1 10/2004 Conrad et al.
(Continued)

FOREIGN PATENT DOCUMENTS

WO WO 2013/096944 A1 6/2013

OTHER PUBLICATIONS

Providing simulated online and mobile learning experiences in a prison education setting: Lessons learned from the PLEIADES pilot project. Farley, Helen; Murphy, Angela; Bedford, Tasman. International Journal of Mobile and Blended Learning 6.1: 17-32. IGI Global. (Jan. 1, 2014).*

(Continued)

*Primary Examiner* — Timothy Padot
(74) *Attorney, Agent, or Firm* — Sterne, Kessler, Goldstein & Fox P.L.L.C.

(57) ABSTRACT

The current disclosure relates to a system and method for providing job-specific training material to an inmate within a controlled environment. In an embodiment, the system authenticates an inmate by receiving at least one authentication request at a control platform from a wireless multi-function device in response to an inmate-initiated action and provides the inmate access to interactive training materials stored on a training database or an employment subsystem configured to provide an interface for the inmate to perform one or more job-specific tasks upon authenticating the inmate. Access to each of the databases or subsystem is provided to the inmate based on a profile corresponding to the inmate and the tasks are completed using a wireless multifunction device.

16 Claims, 7 Drawing Sheets

(51) Int. Cl.

| | |
|---|---|
| *H04W 12/08* | (2021.01) |
| *G06Q 10/1053* | (2023.01) |
| *H04L 51/214* | (2022.01) |
| *H04L 67/306* | (2022.01) |
| *H04W 12/06* | (2021.01) |
| *H04L 67/02* | (2022.01) |
| *H04L 9/40* | (2022.01) |

(52) U.S. Cl.
CPC ........ *H04L 12/1831* (2013.01); *H04L 51/214* (2022.05); *H04L 63/08* (2013.01); *H04L 63/10* (2013.01); *H04L 67/02* (2013.01); *H04L 67/306* (2013.01); *H04W 12/06* (2013.01); *H04W 12/08* (2013.01)

(58) Field of Classification Search
CPC ......... H04L 63/08; H04L 63/10; H04L 67/02; H04L 67/306; H04W 12/06; H04W 12/08
USPC ...................................................... 705/7.14
See application file for complete search history.

(56) References Cited

U.S. PATENT DOCUMENTS

| | | | |
|---|---|---|---|
| 7,027,659 B1 | 4/2006 | Thomas | |
| 7,911,513 B2 | 3/2011 | Garrison et al. | |
| 7,912,900 B1* | 3/2011 | Lippert | G06Q 50/20 |
| | | | 434/350 |
| 8,537,981 B1 | 9/2013 | Cyriac et al. | |
| 8,832,374 B1* | 9/2014 | Schaefers | G06F 21/32 |
| | | | 711/115 |
| 8,917,848 B2 | 12/2014 | Torgersrud et al. | |
| 8,929,525 B1 | 1/2015 | Edwards | |
| 9,083,850 B1 | 7/2015 | Higgs | |
| 9,106,789 B1 | 8/2015 | Shipman, Jr. et al. | |
| 9,332,014 B2 | 5/2016 | Keiser et al. | |
| 9,674,198 B1 | 6/2017 | Hodge | |
| 9,723,040 B1* | 8/2017 | Lubbehusen | H04L 67/60 |
| 9,870,713 B1* | 1/2018 | Ducrou | G09B 5/08 |
| 2004/0172652 A1 | 9/2004 | Fisk et al. | |
| 2005/0022229 A1 | 1/2005 | Gabriel et al. | |
| 2006/0280177 A1 | 12/2006 | Gupta et al. | |
| 2008/0057976 A1* | 3/2008 | Rae | H04W 64/003 |
| | | | 455/456.1 |
| 2008/0201158 A1 | 8/2008 | Johnson et al. | |
| 2009/0013359 A1 | 1/2009 | Butler et al. | |
| 2009/0240586 A1 | 9/2009 | Ramer et al. | |
| 2010/0094878 A1 | 4/2010 | Soroca et al. | |
| 2011/0065419 A1 | 3/2011 | Book et al. | |
| 2011/0237221 A1 | 9/2011 | Prakash et al. | |
| 2011/0249073 A1 | 10/2011 | Cranfill et al. | |
| 2011/0307548 A1 | 12/2011 | Fisk et al. | |
| 2012/0257583 A1 | 10/2012 | Keiser et al. | |
| 2012/0262271 A1 | 10/2012 | Torgersrud et al. | |
| 2012/0324244 A1 | 12/2012 | Zipperer et al. | |
| 2013/0179949 A1 | 7/2013 | Shapiro | |
| 2013/0252575 A1 | 9/2013 | Ewell et al. | |
| 2014/0033230 A1 | 1/2014 | Hanna et al. | |
| 2014/0215391 A1 | 7/2014 | Little et al. | |
| 2014/0218466 A1 | 8/2014 | Bloms et al. | |
| 2014/0253663 A1 | 9/2014 | Edwards | |
| 2014/0267547 A1 | 9/2014 | Torgersrud et al. | |
| 2014/0270126 A1 | 9/2014 | Torgersrud et al. | |
| 2014/0273929 A1 | 9/2014 | Torgersrud | |
| 2014/0282898 A1 | 9/2014 | Torgersrud | |
| 2014/0287715 A1* | 9/2014 | Hodge | H04M 3/38 |
| | | | 455/26.1 |
| 2015/0050910 A1 | 2/2015 | Torgersrud | |
| 2015/0188925 A1* | 7/2015 | Gupta | H04L 63/101 |
| | | | 726/4 |
| 2015/0286980 A1* | 10/2015 | Shusterman | G06Q 10/063114 |
| | | | 705/7.15 |
| 2016/0315836 A1* | 10/2016 | Hill | G06F 21/00 |
| 2017/0272435 A1 | 9/2017 | Hodge | |
| 2017/0272440 A1 | 9/2017 | Hodge | |
| 2017/0344927 A1* | 11/2017 | Coletta | G06Q 10/063112 |
| 2019/0026702 A1 | 1/2019 | Hodge | |

OTHER PUBLICATIONS

Electronic Offender Monitor features GSM 3G capability. Product News Network : NA. Thomas Industrial, Inc. (May 16, 2014).*

Copyright Registration Record for "iPhone: The Missing Manual," 6th ed., 2012; 1 page.

DSKeye Gigabit Product Brief, Bitec Ltd. 2007; 2 pages.

Excerpt from Merriam-Webster's Collegiate Dictionary, Tenth Edition, 2002; p. 841.

Excerpt from The American Heritage Dictionary, 5th Ed. (2016); p. 679.

Excerpts from "iPhone: The Missing Manual," 6th ed., Sebastopol, CA: O'Reilly Media, 2012; 556 (submitted in 10 parts).

File History of U.S. Pat. No. 9,083,850, U.S. Appl. No. 13/931,857, filed Jul. 14, 2015.

Gotsopoulos et al., "Remote Controlled DSP Based Image Capturing and Processing System Featuring Two-Axis Motion," Proceedings of the 4th European DSP in Education and Research Conference, Dec. 1-2, 2010; pp. 32-36.

International Search Report and Written Opinion directed to International Patent Appl. No. PCT/US2017/031317, dated Aug. 2, 2017; 16 pages.

International Search Report and Written Opinion directed to International Patent Application No. PCT/US2017/022163, dated Jun. 9, 2017; 12 pages.

Prosecution History of U.S. Pat. No. 8,929,525, U.S. Appl. No. 14/323,582, filed Jul. 3, 2014.

U.S. Appl. No. 61/801,861, filed Mar. 15, 2013; 77 pages.

Corrections Grade Handheld Devices. The Next Generation of Inmate Rehabilitation and Communications. Retrieved from https://web.archive.org/web/20160518000417/http://www.gtl.net/correctional-facility- services/inmate-services/handheld-devices/. Webpage published May 18, 2016.

Lamb, John. ePublic: Prisons: It's an inside job: Software that gives prisoners restricted web access is being tested in a move to boost training, says John Lamb. The Guardian [London (UK)] Apr. 20, 2005: 15.

Inmate Educational Opportunities. Providing Opportunity for Educational Advancement. Retrieved from https://web.archive.org/web/20160516123509/http://www.gtl.net/correctional-facility-services/inmate-services/education/. Webpage published May 16, 2016.

GTL Deploys Groundbreaking New Inspire(TM) Correctional Tablets: Devices offer calling, educational content, and more on a fully secure system. U.S. Newswire [Washington] Jun. 4, 2015.

* cited by examiner

SYSTEM AND METHOD FOR PROVIDING JOB-SPECIFIC TRAINING AND EMPLOYMENT TO RESIDENTS OF A CONTROLLED ENVIRONMENT FACILITY

This application is a continuation of U.S. application Ser. No. 15/655,746, filed Jul. 20, 2017 which is incorporated in its entirety by reference.

FIELD OF INVENTION

The disclosure relates to a system and method for providing job specific training, testing, employment to an offender during incarceration.

BACKGROUND

Incarcerated offenders, on average, are generally less educated than the general population. For example, approximately 36 percent of individuals in state prisons had attained less than a high school education compared with 19 percent of the general U.S. population age 16 and over. In addition to having lower levels of educational attainment, offenders often lack vocational skills and a steady history of employment, which presents a significant challenge for individuals returning from prison to local communities. Further, the dynamics of prison entry and reentry make it hard for this population to accumulate meaningful, sustained employment experience. Finally, the stigma of having a felony conviction on one's record is a key barrier to post-release employment.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
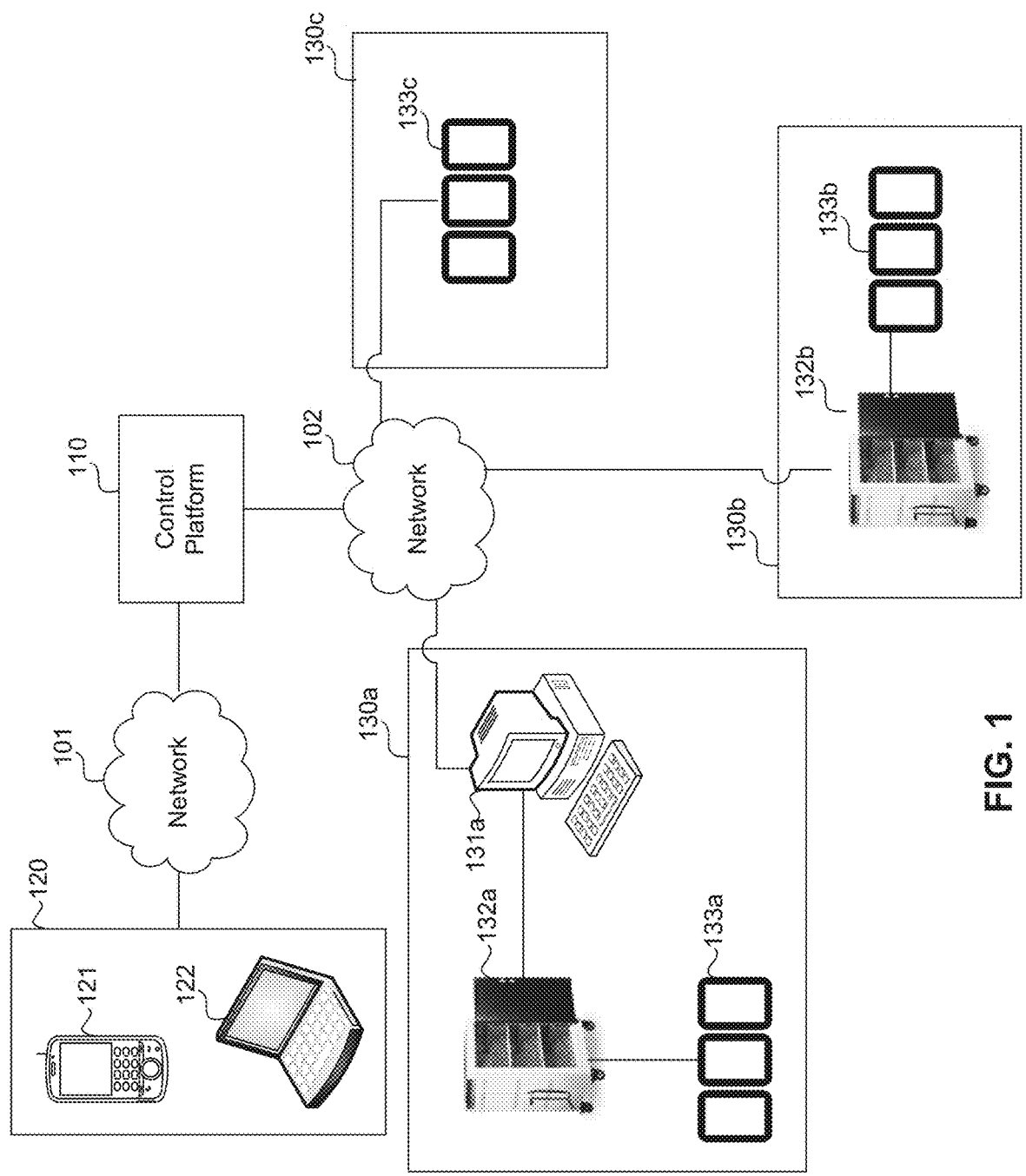
FIG. 1 illustrates a block diagram of an exemplary job-specific training content delivery system, according to the embodiments of the present disclosure.

The present disclosure will be described with reference to the accompanying drawings.

DETAILED DESCRIPTION

The following Detailed Description refers to accompanying drawings to illustrate exemplary embodiments consistent with the disclosure. References in the Detailed Description to "for example", "for instance", "in some embodiments", "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Controlled-environment facilities endeavor to provide residents with access to educational opportunities for rehabilitative purposes and to curtail recidivism in residents ultimately released. Further, controlled-environment facilities endeavor to provide residents with opportunities to work and earn money while inside the facility. However, educational courses require highly specialized, curriculum-dependent materials, which can be expensive to acquire and maintain and work opportunities are very limited. A solution lies in specially designed, secure, multifunction wireless devices containing pre-loaded and/or stream-able, resident-specific and job-specific training content. Given the operating constraints within a controlled-environment facility, these multifunction wireless devices must be carefully limited in content and functionality to ensure that residents do not utilize the multifunction wireless devices for unsanctioned activities. Moreover, the multifunction wireless devices receive job-specific training content from teachers administering course curricula and/or job-specific training from locations entirely outside of the controlled-environment facility. Further, the multifunction wireless devices provide an avenue for the residents to perform work for entities, clients, companies, customers, etc., located outside the controlled-environment facility.

Exemplary Training and Employment System

Educational content and job-specific training materials (hereinafter "training content"), as described throughout, comprises the materials, digital or otherwise, utilized by a student-resident, apprentice, or trainee in completing a voluntary education program and/or job-specific training. Training content is interactive and includes licensed books and lectures pertaining to a curriculum in a voluntary education program, such as a course to earn college credit or pursue a high-school equivalency degree. Training content also can include homework, coursework, examinations, and recommended assignments. The training content may further include interactive job-specific skills training, pertaining to computer programming, information technology, plumbing, masonry, culinary arts, HVAC, electrical work, product assembly or design, product repair, etc.

Employment, as described throughout, comprises job opportunities that are available to correctional institution residents (e.g., inmates or offenders). Upon demonstrating a predetermined skill level in a job-specific task, the offender may perform the job-specific task for pay. Job opportunities are available to residents in career fields including, for example, computer programming, information technology (i.e., "IT"), plumbing, masonry, culinary arts, HVAC, electrical work, product assembly or design, product repair, etc. In an embodiment the job-specific tasks are performed within the correctional institution for a remote entity, client, company, or customer, using the system and methods described herein.

A controlled-environment facility is a correctional institution such as a prison or jail. The residents are inmates incarcerated in the correctional institution. A controlled-environment facility could further be any type of facility providing access to regimented, secure, digital educational/training content or any other facility or environment where a residents' conduct is regulated and scrutinized.

These types of controlled-environment facilities inherently have unique requirements for communications, security, and technological access that do not exist in other, non-controlled environments. In many instances residents are unable to leave the controlled-environment facility to attend educational opportunities, job-specific training, or for employment opportunities. Utilizing a multifunction wireless device to distribute job-specific training content and to provide a platform for performing job-specific tasks, solves numerous practical issues, especially when compared to maintaining large libraries of textbooks, training materials, and other materials. The portable-device approach provides significant cost savings, conserves physical space, enhances security, and provides a secure method of electronic communication with entities, clients, companies, customers, etc., located outside the controlled-environment facility.

However, providing multifunction wireless devices to residents in a controlled-environment facility creates different problems. Authorities have a strong interest in restricting the functionality of the multifunction wireless devices because of the need to ensure that residents are not using the multifunction wireless devices for unsanctioned pursuits. A multifunction wireless device in a controlled-environment facility must be secure against tampering and manipulation. A multifunction wireless device in a controlled-environment facility must accommodate a broad swath of file types and content formats because the training content and job-specific tasks may not always adhere to a standardize format or approach. Other additional concerns and/or requirements unique to a controlled-environment facility that are not discussed here may arise.

FIG. 1 illustrates a block diagram of an exemplary training content delivery system 100, according to embodiments of the present disclosure. Training content delivery system 100 includes control platform 110, outside workstation 120, and controlled-environment facility 130. Potentially, in an exemplary training content delivery system 100, multiple instances of controlled-environment facilities 130 are geographically dispersed, with each facility servicing a different set of residents in a different location.

Control platform 110 consists of a plurality of servers processing web-based traffic constituting uploads and downloads of training content and HTTP request methods. Front-end servers employ a standard web server technology, for instance Microsoft IIS or Apache, to listen for, process, and respond to any incoming requests. Control platform 110 returns pages to the users via HTTP, which it formulates in accordance with hypertext transfer protocol W3C standards. The returned pages also include images, stylesheets, and scripts, the content and nature of which will be appreciated by those skilled in the relevant art(s).

Control platform 110 utilizes a multi-tiered architecture to accommodate incoming requests. Control platform 110 incorporates a presentation tier providing users the ability to access, organize, change, delete, and otherwise administer the training content via a graphical, web-based user interface. Control platform 110 encompasses a logic tier to organize training content in the back-end and provide advanced business logic and reporting capabilities. Control platform 110 includes a data tier, which stores the training content and catalogues information about the facilities, residents, classes, job-specific tasks, and curricula related to which the training content applies. In an embodiment, this data tier harnesses any commercially available database management system such as Microsoft Access, Microsoft SQL server, an Oracle database, an IBM database, etc. These tiers maintain communicative connections via traditional networking infrastructure such as routers, switches, hubs, firewalls, etc. In an embodiment, the various tiers cohabit one computer workstation.

Control platform 110 implements a centralized storage area network (SAN), network-attached storage (NAS), redundant array of independent disks, and/or any other configuration of storage devices to supply sufficient storage capacity to archive the full panoply of training content. Sufficient storage alternatively exists in any other physically attached magnetic storage, cloud storage, or any additional storage medium. In an embodiment, control platform 110 deploys a commonly utilized hard-disk interface, such as ATA, SATA, SCSI, SAS, and/or fibre for interfacing with a storage medium. As illustrated, control platform 110 is in a single location. However, in an embodiment the array of independent disks and/or any other configuration of storage devices are located in different physical locations across the network. For example, the training content for one job-specific course is stored at a first storage location whereas the training content for a second job-specific course is stored at a second storage location that is physically remote from the first storage location, the control platform 110 comprises both the first and second storage locations.

Control platform 110 may further facilitate communications between outside workstation 120 and controlled-environment facilities 130. As will be discussed in greater detail below, when a resident performs a job-specific task at controlled-environment facility 130 at the request, commission, and/or on behalf of an entity, client, company, or customer at workstation 120. In an embodiment control platform 110 is located on site at the controlled-environment facility. In another embodiment, control platform 110 is located at a facility that is remote from the controlled-environment facility.

Outside workstation 120 connects to control platform 110 via network 101, which includes any or all of a WAN, the Internet, or other public network. Outside workstation 120 includes one or more devices available to outsiders such as wireless communication device 121 and/or computer station 122. Authorized users of outside workstation 120 manage the educational and/or training content stored in control platform 110 by performing various administrative tasks, for example creating new training materials, examinations, or other content associated with the training and employment system. In an embodiment, authorized users of outside workstation 120 may create or update job-specific tasks to be completed by a resident. In another embodiment, authorized users of outside workstation 120 may seek help or guidance in solving a job-specific task. For example, in an embodiment, an authorized user may have an information technology, or IT, issue and the authorized user needs assistance to resolve the issue. In such an embodiment, the authorized user may access control platform 110 and create a task to be completed by a resident. Or in such an embodiment, the authorized user may interact with the resident through the control platform using word processing, web-conferencing, video conferencing, instant voice messaging, instant text messaging, video messaging, SMS, VoIP, or another instant messaging platform that uses video, text, or voice communication.

Authorized users transmit information to control platform 110 through a web portal using a transport protocol, such as TCP/IP. The interaction between outside workstation 120 and control platform 110 is described in further detail below in the discussion of FIG. 2.

Only authorized users can access control platform 110 from an outside workstation 120. Control platform 110 authorizes connections from outside workstation 120 using username/password combinations, which control platform 110 encrypts, stores, and references. In some embodiments, control platform 110 utilizes an alternate authentication methodology, such as two-factor authentication, token authentication, biometric data, etc., to identify, authorize, encrypt, and account for user connections. The level of access granted to users of outside workstation 120 varies depending on the user type; therefore, the functionality provided to users differs depending on the individual user accessing the system.

Controlled-environment facility 130a is an exemplary controlled-environment facility, such as a prison. Potentially, training content delivery system 100 consists of more than one instance of controlled-environment facility 130a. Controlled-environment facility 130a consists of synchronization management console 131a, charging and synchronization station 132a, and one or more multifunction wireless devices 133a. Controlled-environment facility 130a connects to control platform 110 via network 102, which includes any or all of a WAN, the Internet, a packet-switched network, or other public network.

Synchronization management console 131a is a computer workstation with synchronization software installed thereon. Synchronization management console 131a includes computing resources, input/output devices, and a central processing unit. The central processing unit runs a standard operating system such as Microsoft Windows™ or a customized operating system. The central processing unit executes instructions stored on storage local to the central processing unit, for example a hard drive or solid state drive.

In an embodiment, synchronization management console 131a serves as a conduit connecting control platform 110 to charging and synchronization station 132a. Synchronization management console 131a facilitates the downloading of training content to a multifunction wireless device docked in charging and synchronization station 132a. Synchronization management console 131 examines the training content associated to the resident to which the multifunction wireless device is assigned. After determining the differences between the training content on the multifunction wireless device and the training content associated with that resident's courses/available content in control platform 110, synchronization management console 131a formulates an appropriate web request to pass to control platform 110. The web request seeks to download any missing training content from control platform 110. Using HTTP download protocols, synchronization management console 131a opens a consistent pipeline connection to the control platform 110 server where the training content resides and copies the training content to a locally attached storage device. The training content is then pushed to the attached multifunction wireless device during the final phase of the synchronization process.

For example, as a resident completes a course and/or an examination demonstrating an ability to perform a job-specific task at a predetermined skill level, additional training materials may become available to that resident. When the resident's multifunction wireless device attaches to charging and synchronization station 132a, synchronization management console 131*a* would compare the training content on the multifunction wireless device to the content that is available to the resident in control platform 110 based on the resident's demonstrated ability. Synchronization management console 131*a* would recognize that all of the training content available to the resident does not exist on the multifunction wireless device and download it to the multifunction wireless device.

Synchronization management console 131*a* also provides functionality for modifying and organizing records stored in control platform 110 by connecting through an HTTP connection to control platform 110. Similar to connections to control platform 110 from outside workstation 120, users of synchronization management console 131 transmit information or job-specific tasks to control platform 110 through a web portal using a transport protocol, such as TCP/IP. These users receive pages back from control platform 110 in W3C-standard adherent HTML, the format and nature of which will be familiar to one skilled in the relevant art(s). Users from synchronization management console 131*a* connecting to control platform 110 via the web portal: update information about the controlled-environment facility, configure multifunction wireless device information, engage the synchronization module, run device diagnostics, and perform other procedures not here listed.

Synchronization management console 131*a* connects to charging and synchronization station 132*a* via a USB connection. Alternatively, synchronization management console 131*a* connects to charging and synchronization station 132*a* wirelessly, via a Local-Area Network (LAN), a Wide-Area Network (WAN), or the Internet, depending on the location of the synchronization management console 131*a* in relation to charging and synchronization station 132*a*.

Figure 3:
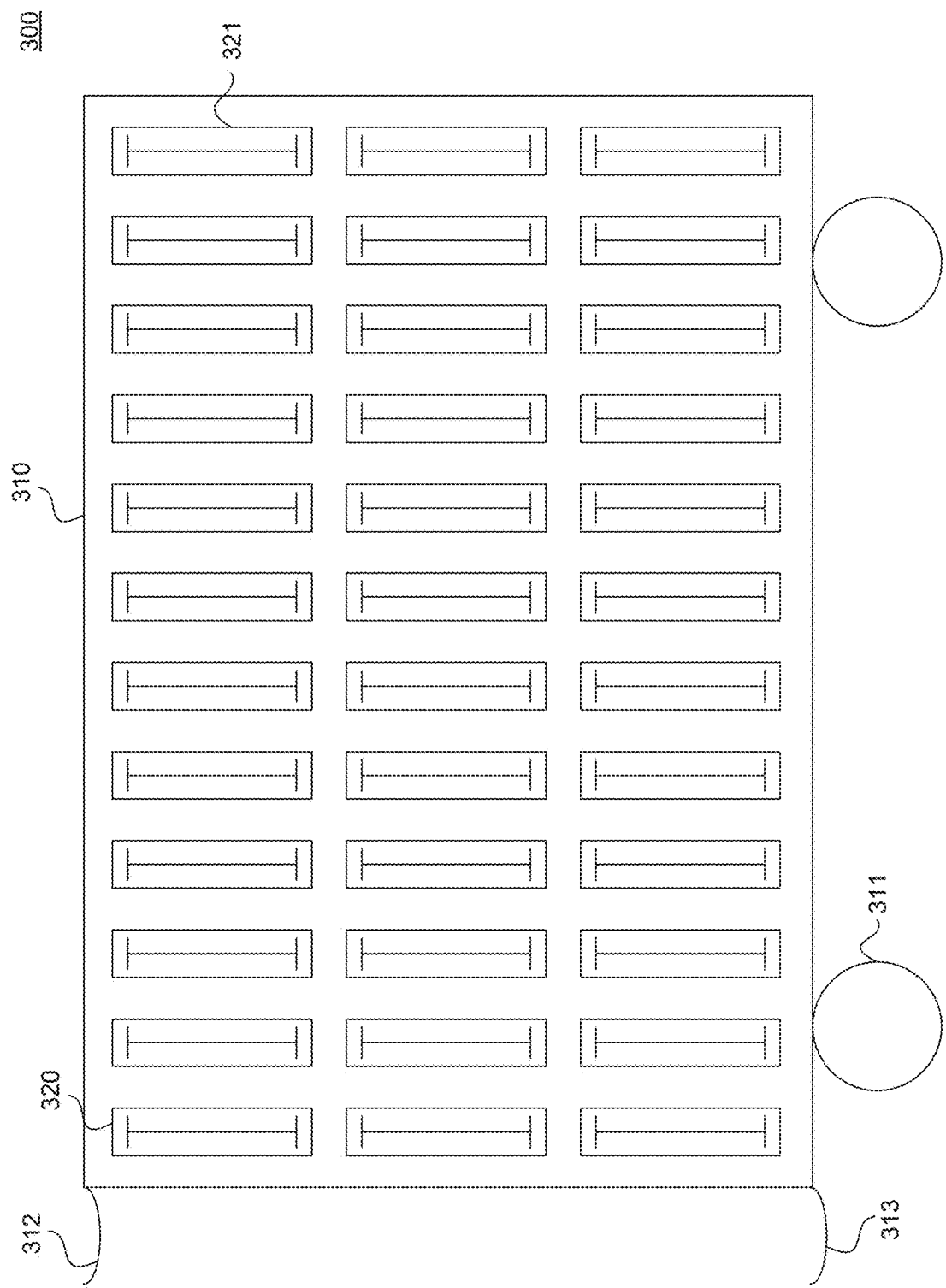
FIG. 3 illustrates a diagram of an exemplary charging and synchronization station, according to the embodiments of the present disclosure.

Charging and synchronization station 132*a* is a mobile cabinet that houses, charges, syncs, and stores one or more multifunction wireless devices 133. Charging and synchronization station 132*a* receives power through a power cord plugging directly into a wall outlet. Charging and synchronization station 132*a* features numerous charging bays for directly interfacing with one or more multifunction wireless devices 133*a*. The discussion below describing FIG. 3 provides further detail on charging and synchronization station 132*a*.

Figure 4:
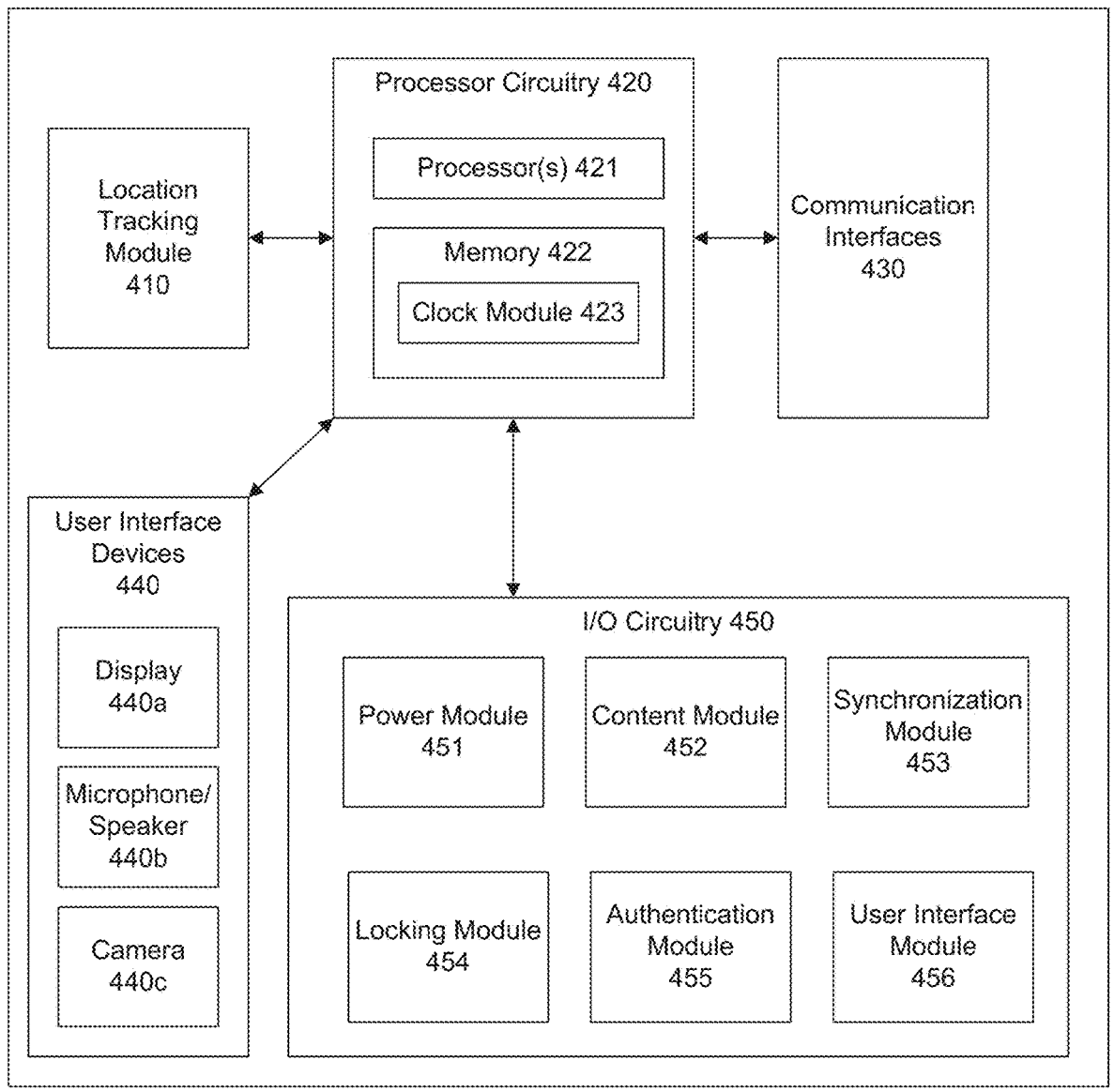
FIG. 4 illustrates a multifunction wireless device used in the exemplary job-specific training content delivery system, according to the embodiments of the present disclosure.

One or more multifunction wireless devices 133*a* connect to charging and synchronization station 132*a* via a USB-Type-A mini connector. One or more multifunction wireless devices 133*a* both charge and download training content via these connections. In an embodiment, one or more multifunction wireless devices 133*a* interface with charging and synchronization station 132*a* via a data bus, e.g., Ethernet, HDMI, and/or USB for data exchange, while receiving a power charge via a separate connection directly from a wall outlet. The data connection also could be achieved via a secure wireless connection via a Local-Area Network (LAN), a Wide-Area Network (WAN), or the Internet. The discussion below detailing FIG. 4 provides further information on the one or more multifunction wireless devices 133*a*.

Controlled-environment facility 130*b* is an exemplary controlled-environment facility, such as a prison. Potentially, training content delivery system 100 consists of more than one instance of controlled-environment facility 130*a*. As shown, in an embodiment controlled-environment facility 130*b* consists of charging and synchronization station 132*b* and one or more multifunction wireless devices 133*b*. Controlled-environment facility 130*b* connects to control platform 110 via network 102, which, as stated above, includes any or all of a WAN, the Internet, a packet-switched network, or other public network. In such an embodiment, charging and synchronization station 132*b* is configured to perform the functionality as described above regarding both the synchronization management console 131*a* and charging and synchronization station 132*a*.

For example, in addition to the other functions described above regarding synchronization management console 131*a*, charging and synchronization station 132*b* facilitates the downloading of training content to a multifunction wireless device docked in charging and synchronization station 132*b* and examines the training content associated to the resident to which the multifunction wireless device is assigned. After determining the differences between the training content on the multifunction wireless device and the training content associated with that resident's courses/available content in control platform 110, synchronization management console 131*a* formulates an appropriate web request to pass to control platform 110. The web request seeks to download any missing training content from control platform 110. Using HTTP download protocols, charging and synchronization station 132*b* opens a consistent pipeline connection to the control platform 110 server where the training content resides and copies the training content to a locally attached storage device. The training content is then pushed to the attached multifunction wireless device during the final phase of the synchronization process.

FIG. 1 further illustrates controlled-environment facility 130*c*, which is an exemplary controlled-environment facility, such as a prison. Potentially, training content delivery system 100 consists of more than one instance of controlled-environment facility 130*c*. As shown, in an embodiment controlled-environment facility 130*c* consists of one or more multifunction wireless devices 133*c*. Controlled-environment facility 130*c* connects to control platform 110 via network 102, which, as stated above, includes any or all of a WAN, the Internet, a packet-switched network, or other public network. In such an embodiment, multifunction wireless devices 133*c* are configured to perform the functionality as described above regarding synchronization management console 131*a* and charging and synchronization stations 132*a* and 132*b*.

For example, in addition to the other functions described above regarding synchronization management console 131*a* and charging and synchronization stations 132*a* and 132*b*, multifunction wireless devices 133*c* connects directly to control platform 110 to download training content and examine the training content associated to the resident to which the multifunction wireless device is assigned. After determining the differences between the training content on the multifunction wireless device and the training content associated with that resident's courses/available content in control platform 110, multifunction wireless devices 133*c* formulate an appropriate web request to pass to control platform 110. The web request seeks to download any missing training content from control platform 110. Using HTTP download protocols, multifunction wireless devices 133*c* open a consistent pipeline connection to the control platform 110 server where the training content resides and copies the training content to a locally attached storage device.

Exemplary Control Platform

Figure 2:
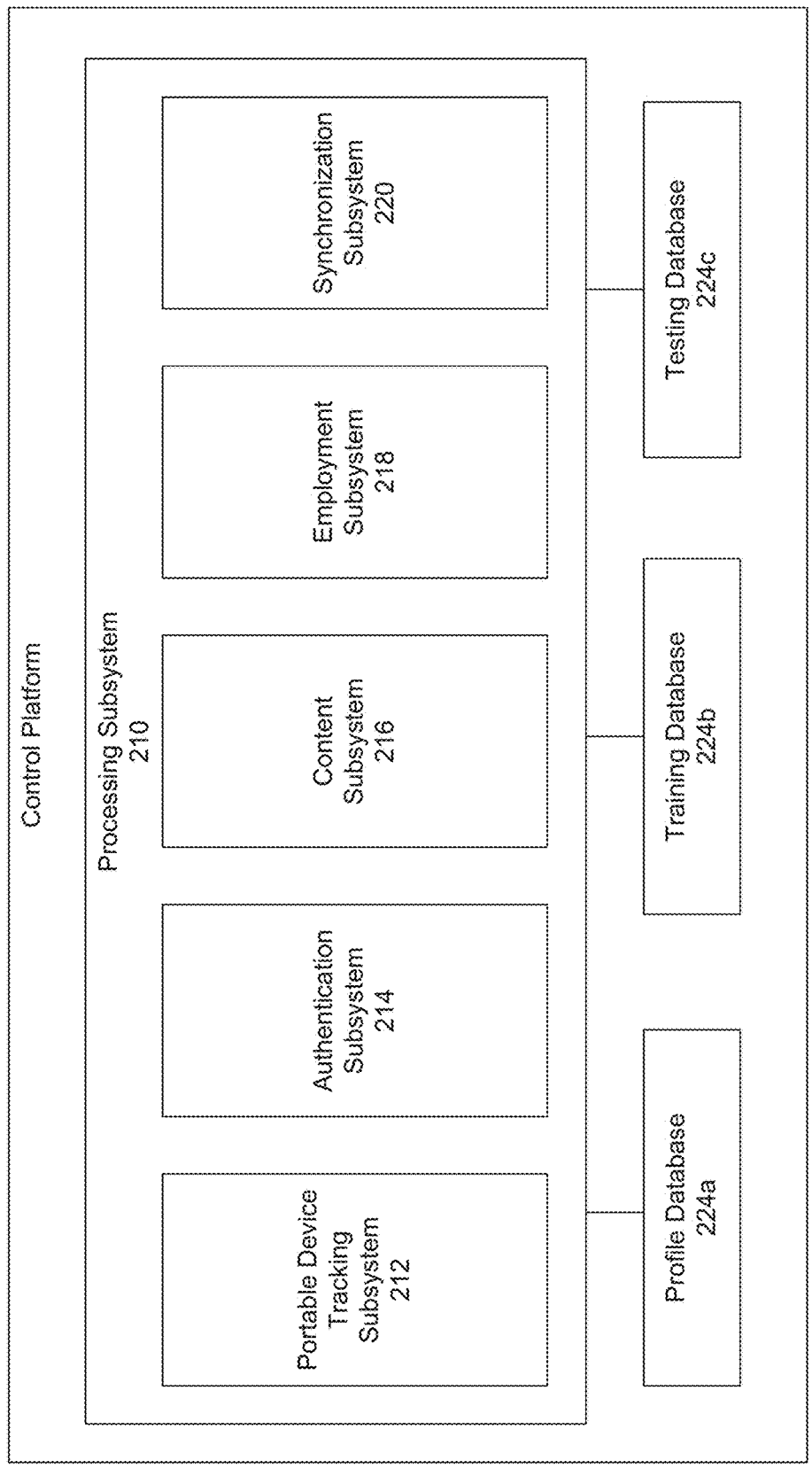
FIG. 2 illustrates a block diagram of an exemplary control platform, according to the embodiments of the present disclosure.

FIG. 2 illustrates a block diagram of exemplary control platform 200, according to the embodiments of the present disclosure. Control platform 200 represents an exemplary embodiment of control platform 110, as displayed in FIG. 1.

Control platform 200 includes processing subsystem 210, profile database 224a, training database 224b, and testing database 224c.

Profile database 224a is configured to store a plurality of profiles, one profile for each inmate. Training database 224b is configured to store training materials comprising job-specific skills training information, stored as distinct training modules. Testing database 224c is configured to store a plurality of interactive testing materials that are configured to determine an ability level related to performing a specific task based on an interaction with the inmate, wherein the interactive testing materials comprise one or more distinct testing modules.

Processing subsystem 210 includes one or more processors, computers, or servers identified as subsystems, which can be construed as individual physical hardware devices or virtual servers. Processing subsystem 210 scales to match the number of simultaneous user connections supported from outside connectors, such as those from outside workstation 120 of FIG. 1. Processing subsystem 210 includes multifunction wireless device tracking subsystem 212, authentication subsystem 214, content subsystem 216, employment subsystem 218, and synchronization subsystem 220.

Multifunction wireless device tracking subsystem 212 maintains detailed records regarding one or more multifunction wireless devices, such as the one or more multifunction wireless devices 133a-c mentioned in FIG. 1. Multifunction wireless device tracking subsystem 212 records information about the "institution" or "facility" that one or more multifunction wireless devices 133a-c inhabit, where an "institution" or "facility" reflects an overall location such as the name, address, or other identifier. For example, the "facility" field could be the name of a prison complex, e.g., "Eastern State Penitentiary." Multifunction wireless device tracking subsystem 212 also records the "location," wherein the "location" is the specific place within an "institution" or "facility" where one or more multifunction wireless devices 133 are located. For example, the "location" could be "Cell 87." Multifunction wireless device tracking subsystem 212 also tracks the resident to which one or more multifunction wireless devices 133a-c are assigned. This resident is the individual who actually accesses and utilizes the educational/training content deployed on the multifunction wireless device.

Authentication subsystem 214 is responsible for securing and protecting control platform 200 while granting authorized users access to appropriate system functions. Authentication subsystem 214 obtains and stores user-profile information for individuals with access to control platform 200. Such user-profile information includes full names, usernames, encrypted passwords, titles, addresses, phone numbers, user types, birthdates, and other fields not here listed. Authentication subsystem 214 tracks user-profile information for both users from outside workstation 120 and users from within controlled-facility environments 130a-c.

The location from which the user is accessing control platform 200 determines the use cases available to the authorized user. Users from outside workstation 120 upload training content to the storage facilities and create, manage, and administer examinations, skill assessments, and job-specific tasks. Users from controlled-environment facility 130a-c download training content, synchronize multifunction wireless devices, perform job-specific tasks, and update facility information.

Authentication subsystem 214 authenticates a user using one or more authentication methods. Authentication subsystem 214 utilizes encrypted user passwords adhering to modern cryptographic principles to ensure that users accessing control platform 200 possess valid credentials. User profile information determines the level of access that a validated user receives. For example, employment administrators/managers retain higher access levels than customers, clients, or other users, leading to access to additional capabilities and functions. For instance, only a user with manager-level access rights can upload additional training content to the repository; an ordinary user can only select from already-uploaded training content.

Content subsystem 216 manages the training content stored in the repository and any licenses associated therewith. Content subsystem 216 maintains a list of the available training content included in various classes, curricula, examinations, certificate programs, job-specific tasks, etc. In an embodiment the training content further includes examination content to determine the user's ability to perform predetermined job-specific tasks. For example, in an embodiment where the user has completed training, or a portion of training, to become a computer programmer, the training content includes examinations to determine the user's ability to perform specific coding tasks based on the completed training.

Employment subsystem 218 stores information about user-created employment tasks to be completed by a resident of a controlled-environment facility. Employment subsystem 218 allows for the aggregation of tasks to maximize convenience and enhance the user experience. For example, a user having a specific need may create a task to be performed, including a computer programming task, an information technology task, a plumbing task, a masonry task, a culinary arts task, an HVAC task, an electrical task, a specific product assembly task, a specific product repair task, or a mechanical task.

Employment subsystem 218 and/or the user determines a specific skill level required for completing the task and/or a desirable interface method for completing the job-specific task (e.g., word processing, web-conferencing, video conferencing, instant voice messaging, instant text messaging, video messaging, SMS, VoIP, or another instant messaging platform that uses video, text, or voice communication). Employment subsystem 218 makes the job-specific task available to residents that have demonstrated the specific skill level required for completing the task and residents with access to a multifunction wireless device configured for the desired interface method. Employment subsystem 218 further manages the progress of each job-specific task, including the current status of the task (i.e., available, in-progress, complete, etc.

In an embodiment, employment subsystem 218 is further configured to provide an interface for the inmate to perform one or more job-related tasks.

Synchronization subsystem 220 manages the data exchange between controlled-environment facility 130a-c and control platform 110. Synchronization subsystem 220 receives an appropriately formatted synchronization request from synchronization management console 131a, charging and synchronization station 132b, or one or more multifunction wireless devices 133c via web request methods. Synchronization subsystem 220 compares the multifunction wireless device profile information contained in the synchronization request to the information as stored in the data repository. When differences exist in the training content and/or available job-specific tasks, synchronization subsystem 200 initiates a connection with synchronization management center 131a, charging and synchronization station 132b, or one or more multifunction wireless devices 133c to allow for the downloading of the missing training content and/or available job-specific tasks. Such functionality is accomplished utilizing HTTP protocols allowing for the creation of a pipeline between synchronization subsystem 220 and a synchronization management console 131a, charging and synchronization station 132b, or one or more multifunction wireless devices 133c. In an embodiment, synchronization management console 131a then passes the training content on to multifunction wireless device 133a, which docks in charging and synchronization station 132a.

Exemplary Charging and Synchronization Station

FIG. 3 illustrates an exemplary charging and synchronization station 300, according to the embodiments of the present disclosure. Charging and synchronization station 300 represents an exemplary embodiment of charging and synchronization station 132a-b of FIG. 1. Charging and synchronization station 300 includes cabinet structure 310 and plurality of charging bays 320. In an embodiment, charging and synchronization station 300 serves as an intermediate interface connecting one or more multifunction wireless devices 133a-b to a control platform 110 via a synchronization management console 131. Charging and synchronization station 300 provides one or more multifunction wireless devices 133a-b with power and a data connection through which to download training content and job-specific tasks from control platform 110.

Charging and synchronization station 300 provides a mechanism by which one or more multifunction wireless devices 133a-b receive electric power and data in a controlled-environment facility 130a-b. One or more multifunction wireless devices 133a-b physically return to charging and synchronization 300 periodically to receive a charge. Administrators then redistribute one or more multifunction wireless devices 133a-b to the appropriate residents. In an embodiment, administrators distribute one or more multifunction wireless devices 133a-b to residents with a power cable to charge via a wall outlet.

Cabinet structure 310 includes cart-mounted wheels 311 and cart-attached handle 312. Cart-mounted wheels 311 provide for increased mobility of cabinet structure 310. Potentially, controlled-environment facility 130 utilizes multiple synchronization management consoles. In a multi-console environment, the increased mobility provided by cart-mounted wheels 311 allow for charging and synchronization station 300 to move between synchronization management consoles. Similarly, cart-attached handle 312 improves the ease of manual manipulation of the entirety of cabinet structure 310.

Cabinet structure 310 includes adapters that connect to a power source and synchronization management console 131. Cable 313 connects the cabinet structure to a power source, which charges any attached multifunction wireless devices. In an embodiment, cable 313 provides a data connection to synchronization management console 131 through which educational content downloads to any attached multifunction wireless devices. Plurality of charging bays 320 includes a data and power connection for each bay. The data connection occurs via a mini-USB-A cable 321 or transpires wirelessly, via a Local-Area Network (LAN), a Wide-Area Network (WAN), or the Internet.

In an embodiment, the charging and synchronization station 300 further includes at least one processor (not shown) configured to perform the functionality as described above regarding both the synchronization management console 131a and charging and synchronization stations 132a and 132b.

In an additional embodiment, charging and synchronization station 300 further a machine-readable medium (not shown) for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Exemplary Multifunction Wireless Device

FIG. 4 illustrates a block diagram of multifunction wireless device 400, according to the embodiments of the present disclosure. Multifunction wireless device 400 provides residents of controlled-environment facility 130 the ability to view educational content downloaded from the central repository of control platform 110. Moreover, multifunction wireless device 400 provides only the functionality needed to view educational content and any other functions are limited or nonexistent. Due to the operating constraints of controlled-environment facility 130, an exemplary multifunction wireless device 400 includes no connection to the Internet or other public networks, no games or other forms of entertainment, no audio/visual editors or word processing tools, nor any other tools unrelated to the specific task of interacting with the training content and/or performing job-specific tasks. In addition, multifunction wireless device 400 is tamperproof and of prison-grade durability, i.e., built to withstand the rigors of controlled-environment facility 130 when that facility is a prison or correctional institute.

Multifunction wireless device 400 includes location tracking module 410, processor circuitry 420, communication interfaces 430, user interface devices 440, and input/output circuitry 450, which all may be communicatively coupled to each other.

Location tracking module 410 allows multifunction wireless device 400 to store device-associated, location-related information. The location-related information includes the institution, facility, and specific location within an institution where multifunction wireless device 400 lives as well as the responsible resident. Location tracking module 410 interacts with display 440 to display the location-related information on the home and locked screens.

Processor circuitry 420 includes one or more processors 421, circuitry, and/or logic configured to control the overall operation of multifunction wireless device 400, including location tracking module 410, communication interfaces 430, display 440, and input/output modules 450. Processor circuitry 420 further includes memory 422 to store data and instructions. Memory 422 is any well-known volatile and/or non-volatile memory, removable and/or non-removable. In memory 422, clock module 423 stores the current date and time for comparative purposes.

Communication interfaces 430 includes one or more transceivers, transmitters, and/or receivers that communicate via a wireless interface or a wired interface. For example, communication interfaces 430 includes a component, such as a USB cable, enabling communication between multifunction wireless device 400 and charging and synchronization station 300. Communication interfaces 430 transmits and receives communications between multifunction wireless device 400 and charging and synchronization station 300.

User interface devices 440 include display 440a, microphone/speaker 440b, and camera 440c. Display 440a is a component for rendering content onto an output device in a format appropriate for user consumption according to principles of human-computer interaction. Display 440*a* is a touchscreen and receives touch inputs from its users. Display 440 contains tamperproof glass, which can withstand the rigors of operating within controlled-environment facility 130*a-c*. Microphone/speaker 440*b* is a component for capturing voice input and/or producing voice output at multifunction wireless device 400. Camera 440*c* is a component for capturing images, video, or a live video stream at multifunction wireless device 400.

Multifunction wireless device 400 includes integrated input/output circuitry 450, comprising power module 451, content module 452, synchronization module 453, locking module 454, authentication module 455, and user interface module 456. These modules are communicatively coupled via internal wiring and networking protocols.

Power module 451 includes circuitry for providing power to multifunction wireless device 400. Power module 451 is a wireless rechargeable battery which can be recharged through various methods. For example, a charging cable connects to a power outlet thereby supplying power to recharge the battery. Power module 451 includes circuitry for powering display 440 and for charging, storing, and maintaining a rechargeable battery inside multifunction wireless device 400. Power module 451 alerts the resident that the power is low, indicating that multifunction wireless device 400 must return to charging and synchronization station 300. In an embodiment, power module 451 includes circuitry for charging using a standard power cable in addition to interfacing with charging and synchronization station 300.

Content module 452 includes circuitry enabling users to access any training content and/or job specific tasks stored on multifunction wireless device 400. Content module 452 includes a document reader that allows a resident to read educational content in the form of pdfs, word documents, text documents, and others not here listed. Content module 452 includes circuitry enabling a video viewer, for example Windows Media Player or Quicktime Player, on which to video file types including AVI, flash, MWV, MP4, and others not here listed. Content module 452 includes circuitry enabling residents to listen to lectures and other educational content in the form of audio file types including way, mp3, aiff, wma, and others not here listed. Content module 451 includes circuitry for enabling residents to participate in at least one of word processing, web-conferencing, video conferencing, instant voice messaging, instant text messaging, video messaging, SMS, VoIP, or another instant messaging protocol that uses video, text, or voice communication.

Synchronization module 453 includes circuitry for managing locally stored training content and/or job-specific tasks when multifunction wireless device 400 engages in the synchronization process.

In an embodiment, multifunction wireless device 400 docks physically in charging and synchronization station 300, which connects to synchronization management console 131. Synchronization module 453 formulates a synchronization request by tabulating the locally stored training content and/or job-specific tasks. The synchronization request passes through synchronization management console 131*a* to control platform 110, where it is compared to the training content and/or job-specific tasks for that device as stored in the central repository. The central repository determines the differences therein. Synchronization module 453 receives a response back indicating the required changes. Based on the response, synchronization module 453: (1) removes any training content and/or job-specific tasks from multifunction wireless device 400 not included on the device; (2) downloads and stores locally any training content and/or job-specific tasks not yet residing on the device; and (3) leaves untouched any training content and/or job-specific tasks on portable 400 that remains included in the device's permissions. In an embodiment, the synchronization request may be sent directly from multifunction wireless device 400 to control platform 110.

Locking module 454 includes circuitry to disable multifunction wireless device 400 whenever the configured return date arrives. Locking module 454 restricts access to multifunction wireless device 400 until the device returns to charging and synchronization station 132. There, the return date resets to a future date based upon user input, and locking module 454 restores access to multifunction wireless device 400. Locking module 454 achieves the lock by engaging power module 451 to disable power to the machine or informing authentication module 455 to lock multifunction wireless device 400 by disabling login.

Authentication module 455 includes circuitry that verifies that the current user is the resident currently responsible for multifunction wireless device 400. Authentication module 455 utilizes any or all of username/password, voice signatures, fingerprints, retinal or iris information, facial information, two-factor authentication, and/or token authentication to verify the identity of the user.

User interface module 456 includes circuitry for controlling the dynamic user interfaces displayed by multifunction wireless device 400 on display 440. User interface module 456 customizes dynamic user interfaces based on the educational content, classes, and curricula pulled for that resident's unique profile. User interface module 456 responds to user inputs in the form of interactions with a touch screen. Accordingly, user interface module 456 provides a dynamic and fully interactive user interface for multifunction wireless device 400.

Exemplary Synchronization Center Operation

Figure 5:
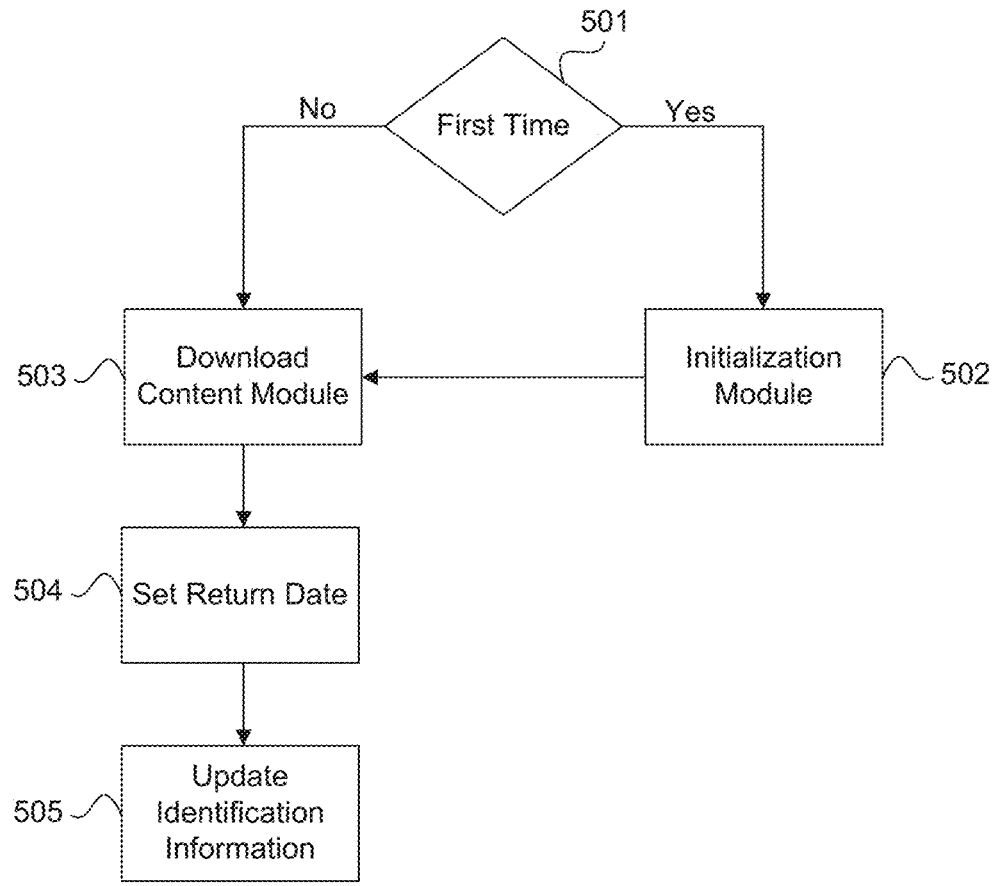
FIG. 5 illustrates a flowchart diagram of a method of synchronizing content when a multifunction wireless device docks with an exemplary charging and synchronization station, according to the embodiments of the present disclosure.

FIG. 5 illustrates a flowchart diagram of method 500 for synchronizing training content and/or job-specific tasks. Method 500 engages when multifunction wireless device 400 of FIG. 4 interfaces with charging and synchronization station 300 of FIG. 3. Method 500 includes the following steps: first time decision point 501, initialization module 502, download content module 503, set return date 504, and update identification information 505. One skilled in the relevant art(s) will appreciate that not all steps must execute to perform the disclosure provided herein. Further, some of the steps execute simultaneously, or in a different order than shown in FIG. 5, as will be understood by a person of ordinary skill in the relevant art(s).

In first time decision point 501, multifunction wireless device 400 determines whether it interfaced previously with charging and synchronization station 300. First time decision point 501 references multifunction wireless device's profile information in order to make this determination. Multifunction wireless device 400 maintains profile information tracking this status using a simple Boolean variable.

When multifunction wireless device 400 interfaces with charging and synchronization station 300 for the first time, initialization module 502 runs. While initialization module 502 executes, multifunction wireless device 400 displays a yellow light, providing a visual cue that the initialization routine is running to an operator. Such a visual cue is necessary because only one initialization routine can run at once on charging and synchronization station 300; initialization module 502 cannot run concurrently with other instances of initialization module 502. Initialization module 502 applies the settings from charging and synchronization station 300 to multifunction wireless device 400 and sets multifunction wireless device 400's status to "operational." Initialization module 502 is skipped if it previously executed on multifunction wireless device 400.

Download content module 503 bears responsibility for downloading any appropriate training content and/or job-specific tasks to the physical storage of multifunction wireless device 400. Download content module 503 executes following initialization module 502 or immediately after first time decision point 501, if initialization module 502 is skipped. Download content module 503 initiates a direct connection to control platform 110's educational-content repository. Alternatively, download content module 503 initiates a connection from multifunction wireless device 400 to synchronization management console 131, where synchronization management console 131 maintains a copy of the educational content.

Upon a successfully completed download of the necessary, up-to-date training content and/or job-specific tasks, set return date 504 updates multifunction wireless device 400's return date. The return date is the date that multifunction wireless device 400 must return to charging and synchronization station 300. When the date arrives and multifunction wireless device 400 has not yet returned to charging and synchronization station 300, locking module 454 engages, and the device stops operating.

Update identification information 505 is responsible for performing any record keeping regarding multifunction wireless device 400's identifying information. This information includes the institution, facility, and location information associated with multifunction wireless device 400. This information also includes changes to the responsible resident that would occur when multifunction wireless device 400 gets assigned to a different resident. Update identifying identification 505 communicates any changes to display 440 in order to display up-to-date information on the lock screen and home screen of multifunction wireless device 400.

Exemplary Computer Implementation

It will be apparent to persons skilled in the relevant art(s) that various elements and features of the present disclosure, as described herein, operate in hardware using analog and/or digital circuits, in software, through the execution of computer instructions by one or more general purpose or special-purpose processors, or as a combination of hardware and software.

This disclosure provides the following description of a general purpose computer system for the sake of completeness. Hardware or a combination of software and hardware implement the embodiments of the present disclosure. Consequently, a computer-system environment or other processing systems achieve the embodiments included in this disclosure. This description describes various software implementations in terms of this exemplary computer system. For example, one or more computer systems or other processing systems carry out the methods of FIG. 5. After reading this description, it will be apparent to a person skilled in the relevant art(s) how to implement the disclosure using other computer systems and/or computer architectures.

Figure 6:
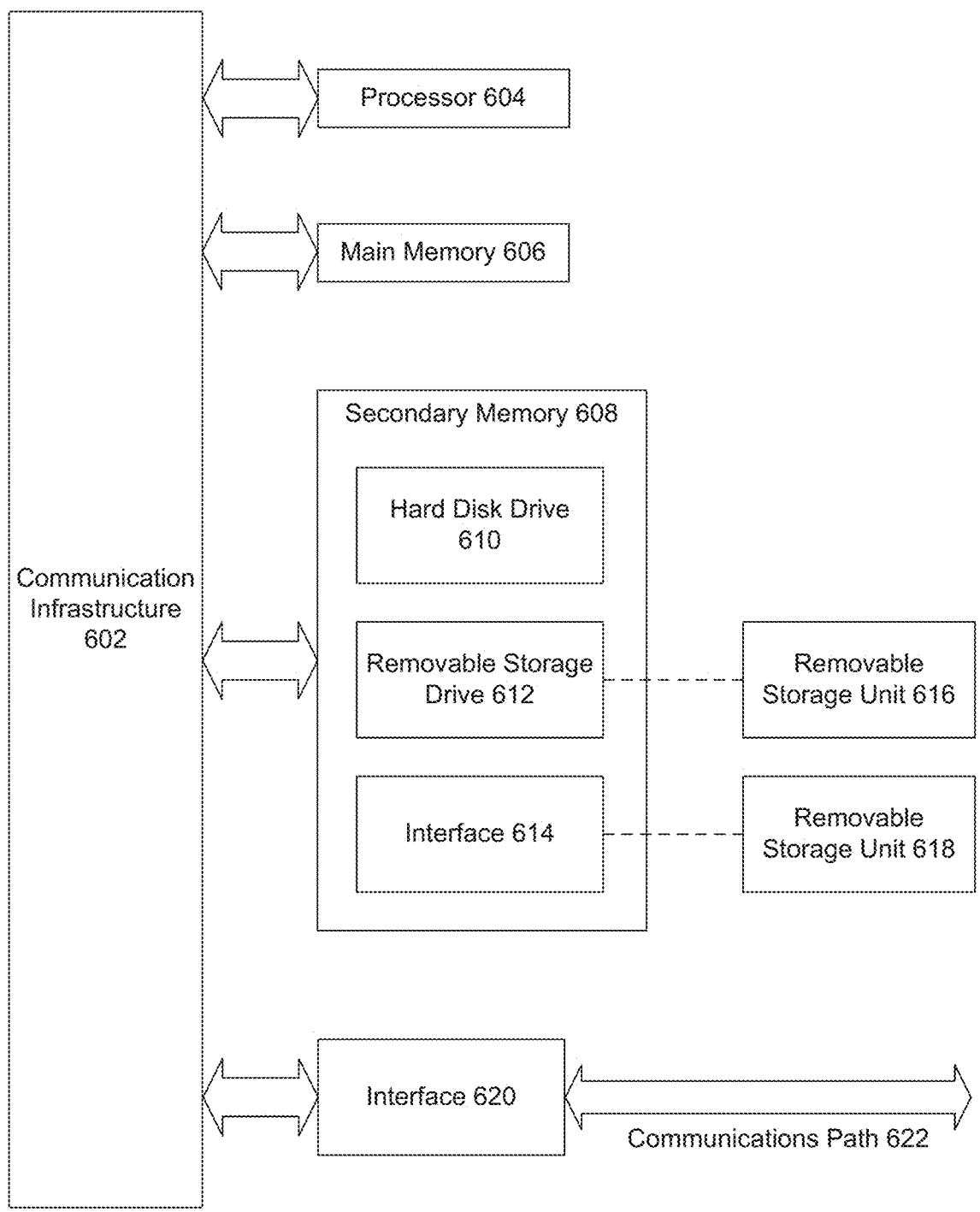
FIG. 6 illustrates block diagram of a general purpose computer used to perform various aspects of the present disclosure.

FIG. 6 demonstrates an example of a computer system 600. One or more distinct computer systems 600 implement, at least partially, one or more of the modules depicted in the previous figures. Computer system 600 includes one or more processors, such as processor 604. In an embodiment, processor 604 is a special purpose or a general purpose digital signal processor. Processor 604 connects to a communication infrastructure 602 (for example, a bus or network).

Computer system 600 also includes a main memory 606, preferably random access memory (RAM), and in some embodiments also includes a secondary memory 608. In some embodiments, secondary memory 608 includes a hard disk drive 610 and/or a removable storage drive 612, representing a floppy disk drive, a magnetic tape drive, or an optical disk drive. Removable storage drive 612 reads from and/or writes to a removable storage unit 616 in a well-known manner. Removable storage unit 616 represents a floppy disk, magnetic tape, optical disk, or other storage medium, which removable storage drive 612 reads from and writes to.

In alternative implementations, secondary memory 608 includes other similar means for allowing computer programs or other instructions to load into computer system 600. Such means include, for example, a removable storage unit 618 and an interface 614. Examples of such means include a program cartridge and cartridge interface (such as that found in video game devices), a removable memory chip (such as an EPROM, or PROM) and associated socket, a thumb drive and USB port, and other removable storage units 618 and interfaces 614, which allow software and data to transfer from removable storage unit 618 to computer system 600.

Computer system 600 includes interface 620. Interface 620 allows software and data to transfer between computer system 600 and external devices. Examples of interface 720 include a modem, a network interface (such as an Ethernet card), a communications port, and/or a PCMCIA slot and card. Software and data transferred via interface 620 take the form of signals which may be electronic, electromagnetic, optical, or other signals capable of reception by interface 620. These signals reach interface 620 via a communications path 622. Communications path 622 carries signals using wire or cable, fiber optics, a phone line, a cellular phone link, an RF link and/or other communications channels.

As used herein, the terms "computer program medium" and "computer readable medium" refer generally to tangible storage media such as removable storage unit 616, removable storage unit 618, or a hard disk installed in hard disk drive 610. These computer program products provide software to computer system 600.

Computer programs (also called computer control logic) reside in main memory 706 and/or secondary memory 608. Computer programs issue via interface 620. Such computer programs, when executed, enable computer system 600 to implement the present disclosure. In particular, the computer programs, when executed, enable processor 604 to implement the processes of the present disclosure and any of the methods described herein. Accordingly, such computer programs represent controllers of computer system 600. Where the disclosure uses software, the software persists in a computer program product and loads into computer system 600 using removable storage drive 612, interface 614, or interface 620.

In another embodiment, features of the disclosure exist primarily in hardware using, for example, hardware components such as application-specific integrated circuits (ASICs) and gate arrays. Implementation of a hardware state machine so as to perform the functions described herein will also be apparent to persons skilled in the relevant art(s).

Exemplary Method for Delivering Training Content

Figure 7:
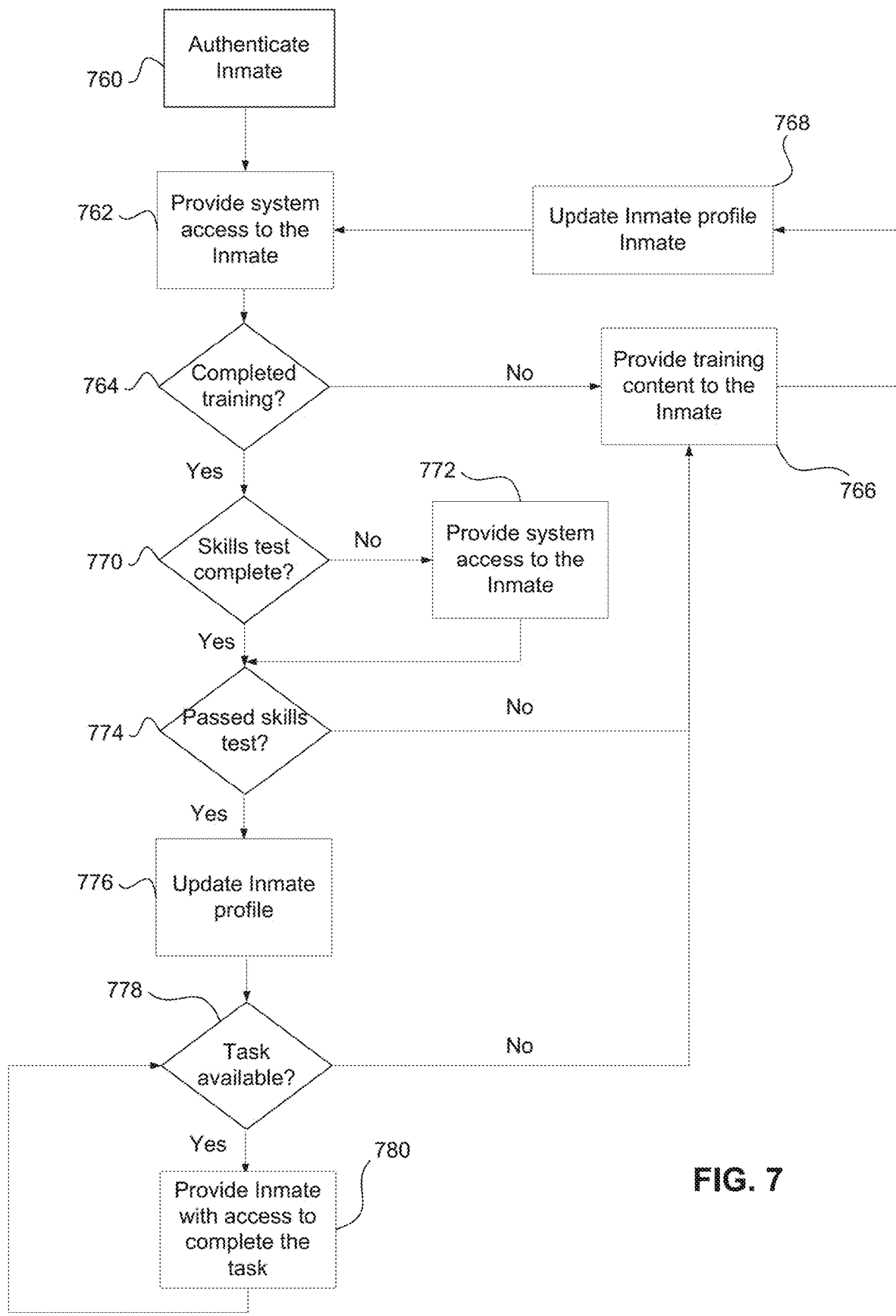
FIG. 7 illustrates a flowchart diagram of a method of a method for providing job-specific training content and/or job-specific tasks, according to the embodiments of the present disclosure.

FIG. 7 illustrates an exemplary embodiment of a method for providing job-specific training content and/or job-specific tasks to a resident of a controlled-environment facility using the systems and structures described above and in FIGS. 1-4 and 6.

At step 760, the system authenticates a resident of a controlled-environment facility (e.g., an inmate) by receiving at least one authentication request from a wireless multifunction device in response to an inmate-initiated action.

At step 762, the system provides the inmate with electronic access to the system based, at least in part, on the inmate's profile. As detailed above, access includes obtaining training content and/or job-specific tasks that are available for completion, based on a demonstrated skill level with respect to the available task.

At step 764, the system accesses the inmate's profile to determine whether the inmate has completed a predetermined amount of training. For example, in an embodiment, a system administrator may define an amount of training content that must be completed before the inmate can progress or gain access to additional testing materials and/or additional training content. If, at step 764, the system determines that the inmate has not completed a sufficient amount of training, initial/additional training is provided at step 766. If, at step 764, the system determines that the inmate has completed a sufficient amount of training, the system will determine whether the inmate has taken an associated job-specific skills test at step 770.

At step 766, the system provides training content to the inmate. Upon completion of the training content, the system updates the inmate's profile at step 768 and returns to step 762 where, again, the system provides the inmate with electronic access to the system based, at least in part, on the inmate's profile.

At step 770, the system accesses the inmate's profile to determine whether the inmate has taken a predetermined job-specific skills test as dictated based on the inmate's profile and the determined amount of training the inmate has completed. When the inmate has not yet completed a job-specific skills test, the system administers the job-specific skills at step 772.

At step 774, after the system determined that the inmate has already completed a predetermined job-specific skills test (step 770) or after the system has administered the predetermined job-specific skills test (step 772), the system determines whether the inmate has demonstrated an ability to perform a job-specific task with a predetermined level of skill and/or competency. When the system determines that the inmate did not pass the job-specific skills test, i.e., that the inmate did not perform the job-specific task with a predetermined level of skill and/or competency, the system returns to step 766 where the system provides training content to the inmate. In an embodiment (not shown) when the system determines that the inmate did not pass the job-specific skills test the system may return to step 772 and re-administer the job-specific skills an additional time. In such an embodiment, the system may allow the inmate to retake the job-specific skills test up to three times before returning to step 766 where the system provides training content to the inmate.

At step 776, the system synchronizes, modifies, and/or updates the inmate's profile to reflect the outcome of any newly completed job-specific skills testing and/or newly completed training.

At step 778, the system determines whether there are any job-specific tasks to be completed that meet the inmate's demonstrated job-specific skills based on one or more job-specific skills tests. In an embodiment, the job-specific tasks are created on the system by a business entity, a client, a company, or a customer located outside the controlled-environment facility (e.g., outside the penitentiary). When the system determines that there are job-specific tasks to be completed that meet the inmate's demonstrated job-specific skills, the system provides access to the tasks at step 780. When the system determines that there are no job-specific tasks to be completed, the system returns to step 766 to provide training content to the inmate. In an embodiment (not shown), when the system determines that there are no job-specific tasks to be completed, the system loops back to step 778 until a job-specific task that that meet the inmate's demonstrated job-specific skills becomes available or until the inmate logs off the system.

At step 780, the system provides access to the inmate to complete the job-specific task. As described above, the inmate completes the task using word processing, web-conferencing, video conferencing, instant voice messaging, instant text messaging, video messaging, SMS, VoIP, or another instant messaging platform that uses video, text, or voice communication.

Further, at steps 766 and/or 780, the system may perform an automated security scan (not shown) of the actions of the inmate to detect any prohibited interactions. In response to detecting a prohibited action/interaction, the system terminates the inmate's access to the system and notifies a system administrator of the prohibited action/interaction. In an embodiment, the security scan includes scanning all communications for certain keywords and phrases. If a keyword or phrase is found, the message is flagged and sent to the service center or institution for manual examination. The message is translated as necessary, and the files are prepared and encrypted. After passing through the control measures, the message is then routed to the appropriate institution.

In an embodiment where the resident and/or remote user are participating in a web-conference, a video conference, instant voice messaging, video messaging, VoIP, or another instant messaging platform that uses video or voice communication, the system is configured to convert the spoken words into searchable text using voice recognition software. In such embodiments, the converted text is passed through the automated security scan, as described above, to determine whether prohibited communications are occurring.

CONCLUSION

The Detailed Description section, not the Abstract section, should be used to interpret the claims. The Abstract section sets forth one or more, but not all exemplary embodiments, and thus, should not limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

Those skilled in the relevant art(s) will appreciate that various changes in form and detail can be made therein without departing from the spirit and scope of the disclosure. Thus, the disclosure should not be limited by any of the above-described exemplary embodiments and should be defined only in accordance with the following claims and their equivalents.

What is claimed is:

1. A system for providing job-specific training material to an inmate within a controlled environment, the system comprising:
   a profile database that stores a plurality of profiles, each of the plurality of profiles corresponding to a distinct inmate;
   a training database that stores interactive training materials comprising job-specific skills training information stored as distinct training modules;
   a multifunction wireless device, comprising one or more processors configured to:
      receive a return date by which the multifunction wireless device must be returned;
      monitor the return date against a current date; and
      lock, and prevent access to, the multifunction wireless device in response to detecting that the current date exceeds the return date,
      wherein the multifunction wireless device is tamper-proof and comprises locking circuitry configured to disable the multifunction wireless device when a locking event occurs; and
   a control platform, comprising one or more servers, in electronic communication with the profile database, the training database, and the multifunction wireless device, the control platform configured to:
      generate the return date for the multifunction wireless device;
      authenticate the inmate by receiving at least one authentication request from the multifunction wireless device in response to an inmate-initiated action;
      provide the inmate access to the interactive training materials based on a profile corresponding to the inmate and a successful authentication of the inmate, via the multifunction wireless device, the providing including:
         receiving a list of training content items from the multifunction wireless device that includes at least one of a corresponding completion or proficiency for each of the training content items;
         comparing the list of training content items to a list of available training content items; and
         identifying additional available training content items based on the comparing;
      perform an automated security scan of an interaction between the inmate and at least one of the interactive training materials or the interactive testing materials to detect any prohibited interactions;
      terminate access to the interactive training materials in response to detecting a prohibited interaction between the inmate and the interactive training materials;
      receive updates corresponding to the interaction between the inmate and at least one of the interactive training materials; and
      modify the profile corresponding to the inmate based on the received updates.

2. The system of claim 1, wherein the job-specific training information relates to at least one of: a computer programming task, an information technology task, a plumbing task, a masonry task, a culinary arts task, an HVAC task, an electrical task, a specific product assembly task, a specific product repair task, and a mechanical task.

3. The system of claim 1, wherein the multifunction wireless device further comprises location tracking circuitry configured to detect a location of the multifunction wireless device.

4. The system of claim 1, further comprising an employment subsystem configured to provide an interface for the inmate to perform one or more job-specific tasks; and
   wherein the control platform is further configured to provide the inmate access to a secure online job platform to perform the one or more job-specific tasks for pay.

5. The system of claim 4, wherein the secure online job platform is configured to track an amount of time the inmate spends performing the specific task and to calculate a monetary value for the specific task based on at least one of the amount of time spent performing the specific task or a number of times the specific task was performed.

6. The system of claim 4, wherein the employment subsystem is configured to conduct at least one of a telephone call, a web-conference, a video conference, an instant voice message, an instant text message, a video message, an SMS communication, or a VoIP communication.

7. The system of claim 1, wherein the control platform is further configured to authenticate the inmate using at least one of: a login and password information, a biometric information, or a radio frequency identification.

8. The system of claim 1, wherein the interaction comprises a completion of a training module.

9. A method for providing job-specific training material to an inmate within a controlled environment, the method comprising:
   authenticating an inmate by receiving at least one authentication request at a control platform, comprising one or more servers, from a multifunction wireless device in response to an inmate-initiated action,
   wherein the multifunction wireless device is tamperproof and comprises locking circuitry configured to disable the multifunction wireless device when a locking event occurs;
   generating a return date for the multifunction wireless device;
   monitoring the return date against a current date;
   locking, and preventing access to, the multifunction wireless device in response to detecting that the current date exceeds the return date;
   providing the inmate access to interactive training materials stored on a training database, the interactive training materials comprising job-specific skills training information stored as distinct training modules the providing including:
      receiving a list of training modules from the multifunction wireless device that includes at least one of a corresponding completion or proficiency for each of the training modules;
      comparing the list of training modules to a list of available training modules;
      identifying additional available training content items based on the comparing,
      wherein the access is provided to the inmate based on a profile corresponding to the inmate stored in a profile database and a successful authentication of the inmate, via the multifunction wireless device;
   performing an automated security scan of an interaction between the inmate and at least one of the interactive training materials or the interactive testing materials to detect any prohibited interactions;
   terminating the access to the interactive training materials in response to detecting a prohibited interaction between the inmate and the interactive training materials;

receiving updates at the control platform corresponding to the interaction between the inmate and the interactive training materials; and modifying the profile corresponding to the inmate based on the received updates.

10. The method of claim 9, wherein the job-specific training information relates to at least one of: a computer programming task, an information technology task, a plumbing task, a masonry task, a culinary arts task, an HVAC task, an electrical task, a specific product assembly task, a specific product repair task, and a mechanical task.

11. The method of claim 9, further corn rising sending a notification to a system administrator in response to detecting the prohibited interaction between the inmate and the interactive training materials during the automated security scan.

12. The method of claim 9, further comprising determining an ability level of the inmate to perform a specific task based at least in part on the interaction of the inmate with the one or more distinct training modules of the interactive training materials using the control platform, wherein the specific task is related to the provided interactive training materials.

13. The method of claim 12, wherein the specific task comprises at least one of: a computer programming task, an information technology task, a plumbing task, a masonry task, a culinary arts task, an HVAC task, an electrical task, a specific product assembly task, a specific product repair task, or a mechanical task.

14. The method of claim 9, further comprising providing the inmate access to a secure online job platform to perform the specific task.

15. The method of claim 14, further comprising:
tracking, at the secure online job platform, an amount of time the inmate spends performing the specific task; and calculating, at the secure online job platform, a monetary value for the specific task based on at least one of the amount of time spent performing the specific task or a number of times the specific task was performed.

16. The method of claim 9, wherein the multifunction wireless device further comprises location tracking circuitry configured to detect a location of the multifunction wireless device.

* * * * *

UNITED STATES PATENT AND TRADEMARK OFFICE
CERTIFICATE OF CORRECTION

| | |
|---|---|
| PATENT NO. | : 11,829,955 B2 |
| APPLICATION NO. | : 17/451672 |
| DATED | : November 28, 2023 |
| INVENTOR(S) | : Hodge |

It is certified that error appears in the above-identified patent and that said Letters Patent is hereby corrected as shown below:

In the Specification

In Column 13, Line 42, delete "way," and insert -- wav, --, therefor.

In the Claims

In Column 20, Claim 9, Line 29, delete "an" and insert -- the --, therefor.

In Column 21, Claim 11, Line 12, delete "corn rising" and insert -- comprising --, therefor.

Signed and Sealed this
Thirteenth Day of February, 2024

*Katherine Kelly Vidal*

Katherine Kelly Vidal
*Director of the United States Patent and Trademark Office*